US006992596B2

(12) United States Patent
Cole et al.

(10) Patent No.: US 6,992,596 B2
(45) Date of Patent: Jan. 31, 2006

(54) SIMPLIFIED FLIGHT TRACK DISPLAY SYSTEM

(75) Inventors: James Cole, East Setauket, NY (US); Matthew Marcella, West Hempstead, NY (US); Ron Dunsky, Brooklyn, NY (US)

(73) Assignee: Megadata, Greenwich, CT (US)

( * ) Notice: Subject to any disclaimer, the term of this patent is extended or adjusted under 35 U.S.C. 154(b) by 60 days.

(21) Appl. No.: 10/408,298

(22) Filed: Apr. 4, 2003

(65) Prior Publication Data

US 2004/0104824 A1 Jun. 3, 2004

Related U.S. Application Data

(60) Provisional application No. 60/370,628, filed on Apr. 4, 2002.

(51) Int. Cl.
*G01C 21/00* (2006.01)

(52) U.S. Cl. .................................... 340/971; 340/973

(58) Field of Classification Search ................ 340/945, 340/947, 951, 953, 954, 961, 964, 967, 971, 340/963, 973; 342/26 R, 29, 180; 701/3
See application file for complete search history.

(56) References Cited

U.S. PATENT DOCUMENTS 4,442,491 A * 4/1984 Olhausen, Jr. .............. 701/221
5,075,694 A * 12/1991 Donnangelo et al. ....... 342/455
5,111,400 A * 5/1992 Yoder ............................ 701/3
5,208,591 A * 5/1993 Ybarra et al. ............... 340/961
5,339,085 A * 8/1994 Katoh et al. ................ 342/180
5,467,274 A * 11/1995 Vax ............................. 701/14
5,907,568 A * 5/1999 Reitan, Jr. ................ 342/26 R
5,936,552 A * 8/1999 Wichgers et al. ........... 340/963
6,199,008 B1 * 3/2001 Aratow et al. .............. 701/120
6,380,869 B1 * 4/2002 Simon et al. ............... 340/945
6,816,762 B2 * 11/2004 Hensey et al. ................ 701/35

* cited by examiner

*Primary Examiner*—Van T. Trieu
(74) *Attorney, Agent, or Firm*—Fay Kaplun & Marcin, LLP

(57) ABSTRACT

A system, comprising a data receiving arrangement to receive target data points from a data feed arrangement, each target data point including data corresponding to a location of a target aircraft and additional information on the target aircraft, a data analyzing arrangement to analyze the target data points and store each target data point in a target flight record, the target flight record corresponding to the target aircraft a data generation arrangement to generate a flight track for the target aircraft using the data stored in the target flight record and a data distribution arrangement to organize the flight track and the additional information into a displayable file and distribute the file to users of the system, wherein the displayable file is displayed on a single graphical user interface including the flight track and the additional information.

22 Claims, 7 Drawing Sheets

FTDS System Server Operation -- 10

SIMPLIFIED FLIGHT TRACK DISPLAY SYSTEM

INCORPORATION BY REFERENCE

This application claims the benefit of U.S. Provisional Patent Application 60/370,628 filed on Apr. 4, 2002 and entitled “Simplified Flight Track Display System” and is expressly incorporated herein, in its entirety, by reference.

BACKGROUND INFORMATION

There may be multiple reasons for individuals that live in the vicinity of an airport to desire to know the flight paths of planes in the area. For example, an individual may notice a plane that is flying a path that is not recognized by the individual (e.g., normally a plane on approach to the airport does not fly directly over the house, etc.). A particular plane may be flying low and causing a noise nuisance and/or the plane may be at or near the normal altitude, but is still causing an excessive amount of noise. A particular plane may make a maneuver that is questioned by the individual. A person may be looking to buy a house in a certain neighborhood and wants to research the flight paths over that neighborhood. These are only a few examples of the usefulness of flight path information and there are many other reasons why the flight paths of planes need to be known to private individuals. In addition, it is difficult to visually ascertain the true altitude and flight path of an aircraft.

However, it is very difficult for individuals to determine information associated with these flight paths even though most of the information associated with the flights is publically available information based on Federal Aviation Administration (“FAA”) and airport records. In For example, if an individual wanted to make a complaint about noise because of an airplane, the individual generally would like to be able to give some specifics about the airplane such as the general vicinity of the airplane, the altitude, the type of airplane, the airline, etc. But the average person who is not intimately familiar with airplanes and flight information cannot tell this information by looking up at the plane. The individual could go to the airport, the airport authority or the local FAA office and request the records, but this is difficult and time consuming. A simplified manner of tracking flights and flight paths that is available to the general public is needed to address issues such as described above.

SUMMARY OF THE INVENTION

A system, comprising a data receiving arrangement to receive target data points from a data feed arrangement, each target data point including data corresponding to a location of a target aircraft and additional information on the target aircraft, a data analyzing arrangement to analyze the target data points and store each target data point in a target flight record, the target flight record corresponding to the target aircraft a data generation arrangement to generate a flight track for the target aircraft using the data stored in the target flight record and a data distribution arrangement to organize the flight track and the additional information into a displayable file and distribute the file to users of the system, wherein the displayable file is displayed on a single graphical user interface including the flight track and the additional information.

In addition, a method, comprising the steps of collecting target data points corresponding to data for target aircrafts, storing each of the target data points in a target flight record, wherein each target flight record corresponds to one target aircraft and each target data point includes data corresponding to a location of the one target aircraft and additional information on the one target aircraft, creating flight tracks from each of the target flight records and creating a displayable file including the flight track and the additional information, wherein the displayable file is displayable on a single graphical user interface.

Furthermore, a system, comprising a system server collecting target data points corresponding to data for target aircrafts, storing each of the target data points in a target flight record, wherein each target flight record corresponds to one target aircraft and each target data point includes data corresponding to a location of the one target aircraft and additional information on the one target aircraft, creating flight tracks from each of the target flight records and creating a displayable file including the flight track and the additional information, wherein the displayable file is displayable on a single graphical user interface and a web server to distribute the displayable file to users of the system.

DETAILED DESCRIPTION

The present invention comprises a simplified flight track display system (“FTDS”) for delivery via a communication network which may be, for example, the Internet, a corporate intranet, etc. The information that is provided to the users (e.g., via a graphical user interface) may include airplanes and other aircraft and their relevant tracks superimposed on a graphical map, such as those created by U.S. government Tiger mapping service or the Microsoft Corporation. For more information on the Tiger mapping service see the domain link http://tiger.census.gov/cgi-bin/mapbrowse-tbl. For more information on the maps created by the Microsoft Corporation see the domain link www.microsoft/mappoint.net. The exemplary embodiment of the present invention is described as a web based system. However, those of skill in the art will understand that there may be any number of other manners of implementing the present invention in embodiments that are not web based.

Figure 1:
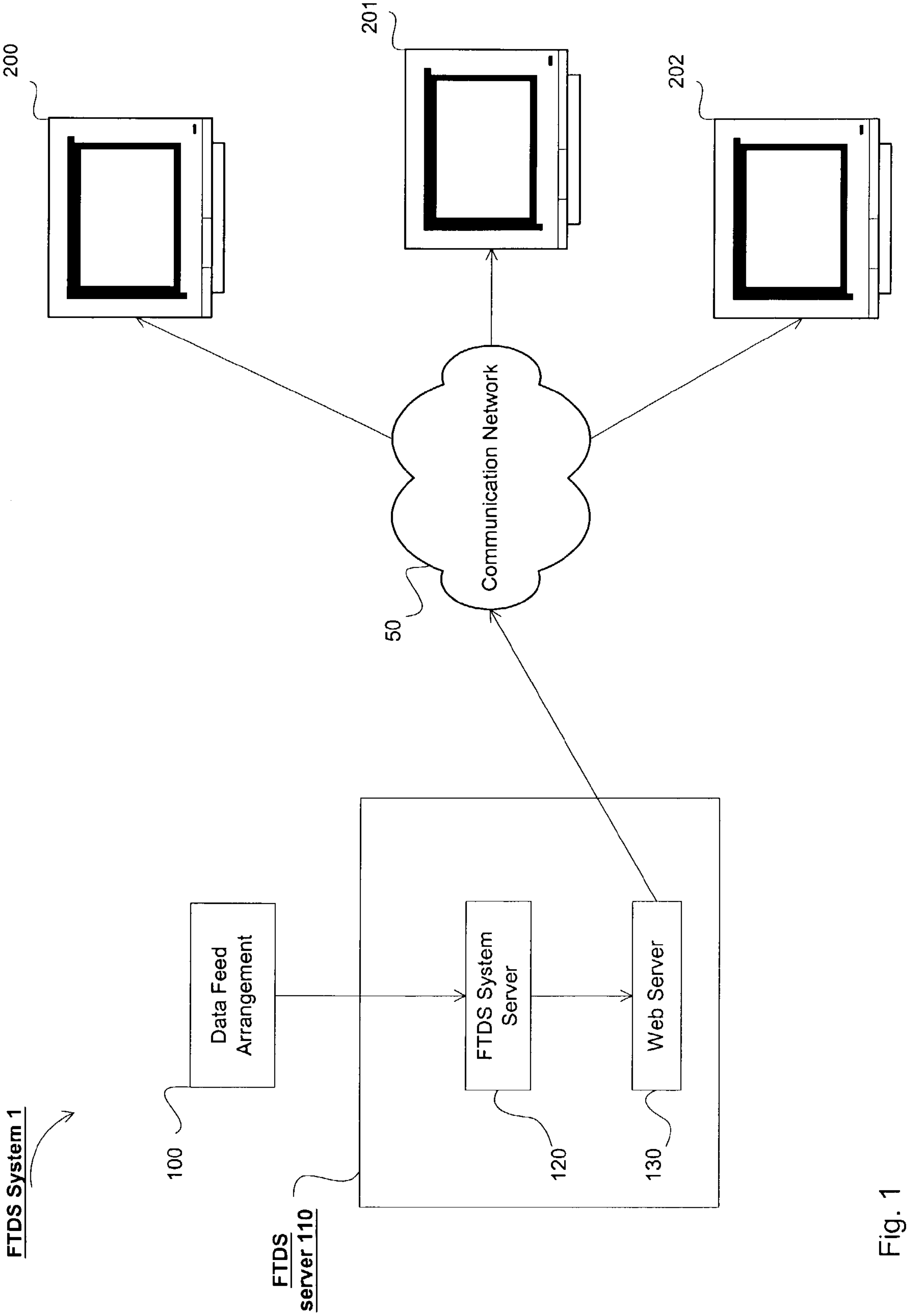
FIG. 1 shows an exemplary system according to the present invention.

FIG. 1 shows an exemplary FTDS system 1 according to the present invention. The data needed to create the flight tracks may be obtained from a data feed arrangement 100. The data feed arrangement 100 may be, for example, the PASSUR™ System sold by Megadata Corporation of Bohemia, N.Y., the AD data set which available for resale from the FAA etc. The data feed arrangement may be one of these systems or a combination of these systems depending on the amount and type of information to be provided on each flight track. The stream of data from the data feed arrangement 100 may consist of target data points. Each target data point may include information about a flight being tracked. Each target data point may include data on the flight, for example, a track identification, the time (e.g., UNIX time), the x-position, the y-position, altitude, x-velocity component, y-velocity component, z-velocity component, the speed, the flight number, the airline, the aircraft type, etc.

Throughout this description the convention will be maintained that each discrete set of data received for a particular flight by the FTDS system server 120 from the data feed arrangement 100 will be called a target data point. Examples of the information included in a target data point are described above. The target data points for an individual flight will be combined by the FTDS system server 120 into a target flight record and when this term is used it should be understood to mean all the target data points for each individual flight track. It should also be understood that the target flight record may include additional information over and above the combination of the target data points for an individual flight. For example, the target flight record may contain specific data used to display the track and indexing information to maintain the data from the target data points in the correct order. The term target is generally used to describe a flight (or aircraft) which is to be tracked. Throughout this description the airplanes are used as exemplary targets, but other aircraft may be used as well, e.g., helicopters. The term flight track is used to describe both the data associated with a particular flight and the graphical manifestation of that data as the icon superimposed on the map and the corresponding flight information data display.

The data which is input into the FTDS server 110 from the data feed arrangement 100 may be updated based on the type of system used for the data feed arrangement 100. For example, PASSUR™ System provides real-time data updates at short time intervals (e.g., every 4.6 seconds). Whereas, the ASD data set is updated at a slower interval of 1–4 minutes. Those of skill in the art will understand that a single sweep of the radars associated with the data feed arrangement may produce a plurality of target data points depending on the number of aircraft in the range of the tracking radar. As will be described in greater detail below, the FTDS server 110 will receive the target data points from the various sources and combine and organize the data into a coherent and easy to use flight tracking system. Some data feed arrangements 100 such as the PASSUR™ System provide the input data using a track smoothing process. However, other data feed arrangements 100 may not provide such smoothed data and it is not required to implement the present invention.

The data feed arrangement 100 is connected to the FTDS server 110, which may include, for example, the FTDS System server 120 software and web server 130 software. The connection between the data feed arrangement 100 and the FTDS server 110 may be, for example, a one way socket connection providing a serial stream of target report data, e.g., the target data points described above. The one way socket connection may be preferred to prevent users of the FTDS system 1 from corrupting the data contained in the data feed arrangement 100. However, there may be circumstances where a two way connection between the data feed arrangement 100 and the FTDS server 110 is desirable. The target data points may be transferred to the FTDS server 110 using any standard data format, for example, an ASCII format, a text format, etc.

The FTDS server 110 maybe, for example, a standard PC based server system running an operating system such as LINUX. Those of skill in the art will understand that any computing platform may be used for the FTDS server 110. As the FTDS system server 120 software receives the target data points, it processes and analyzes the data to create flight tracks for the aircraft in the target area. Each target data point, as it is received by the FTDS system server 120 software, is filtered to check whether it is associated with a currently displayed flight track. If the target data point is associated with a previously displayed flight track it is added to the target flight record for that target. If the received target data point does not belong to a currently displayed flight track, the FTDS system server 120 software may start a new target flight record for a new flight track.

Figure 2:
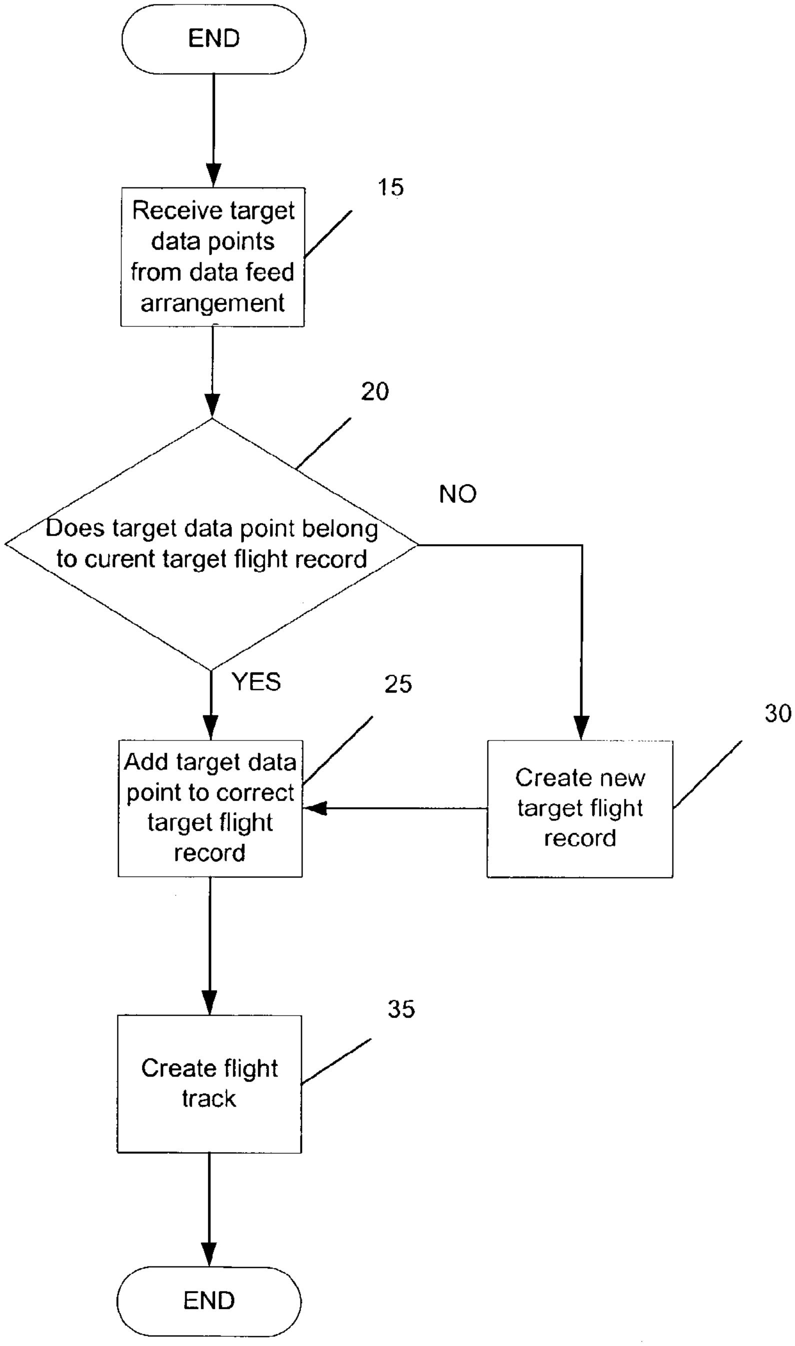
FIG. 2 shows an exemplary process for the processing of the flight information received by the FTDS System server according to the present invention.

FIG. 2 shows an exemplary process 10 for the processing of the flight information received by the FTDS system server 120. In step 15 the FTDS system server 120 receives the target data points input data from the data feed arrangement 100 as described above. In step 20, the FTDS system server 120 determines whether each of the newly received target data points is associated with a current flight track, i.e., whether there is a target flight record with which the target data point is associated. If the target data point is not associated with a current target flight record, the process continues to step 30 where the FTDS system server 120 creates a new target flight record associated with this flight track.

If the target data point is associated with a current target flight record (step 20) or the FTDS system server 120 created a new target flight record (step 30), the process continues to step 25 where the target data point is added to the appropriate target flight record. The process then continues to step 35 where the FTDS system server 120 processes the new data to update the flight track for the target flight. The processing of the data to create the flight track will be described in greater detail below and exemplary displays of flight tracks will be shown and desribed.

The data for the flight track is now processed and the flight track needs to be delivered to the users of the FTDS system 1. The FTDS server 110 may also contain web server 130 software to distribute the flight tracks to users of the FTDS system 1. In the exemplary embodiment of the FTDS system 1 shown in FIG. 1, the flight track generated by the FTDS system server 120 may be transmitted to a plurality of users (e.g., users 200–202) via a communications network 50 (e.g., the Internet). The web server 130 software may host a web page containing the necessary data and information to display the tracking information by local users. The users 200–202 may operate a web browser such as Microsoft's Internet Explorer, Netscape Navigator, or other third-party web browsing software which may access the web page hosted by web server 130 software. The web browser software operated by the users 200–202 will manage the flight track information that is transmitted to the client users 200–202 from the web server 130 software of the FTDS server 110. The data transferred from the FTDS server 110 may be, for example, HTML code or applets.

Thus, when a user (e.g., users 200–202) connects to the FTDS server 110 via communications network 50, the web server 130 software may send an FTDS applet to the user to enable the user to display and control the flight track data sent from the FTDS server 110 to the user. The applet code transferred to the user may be executed by the user's browser to display the tracking information. As the user remains connected to the FTDS server 110, the web server 130 software will continue to deliver data to update the flight tracks on the user's screen. The update may be performed automatically each time the FTDS server 110 receives updated information from the data feed arrangement 100. For example, if the PASSUR™ System is used as the data feed arrangement 100, the updates may occur approximately every 4.6 seconds, i.e., the time that the FTDS server 110 receives updates from the PASSUR™ System plus the processing and data transmission times. The data may be formatted by the FTDS server 110 and delivered to the web browser of the users 200–202 in any standard web browser readable format, for example, HTML format, Java, Java Script, etc.

Figure 3:
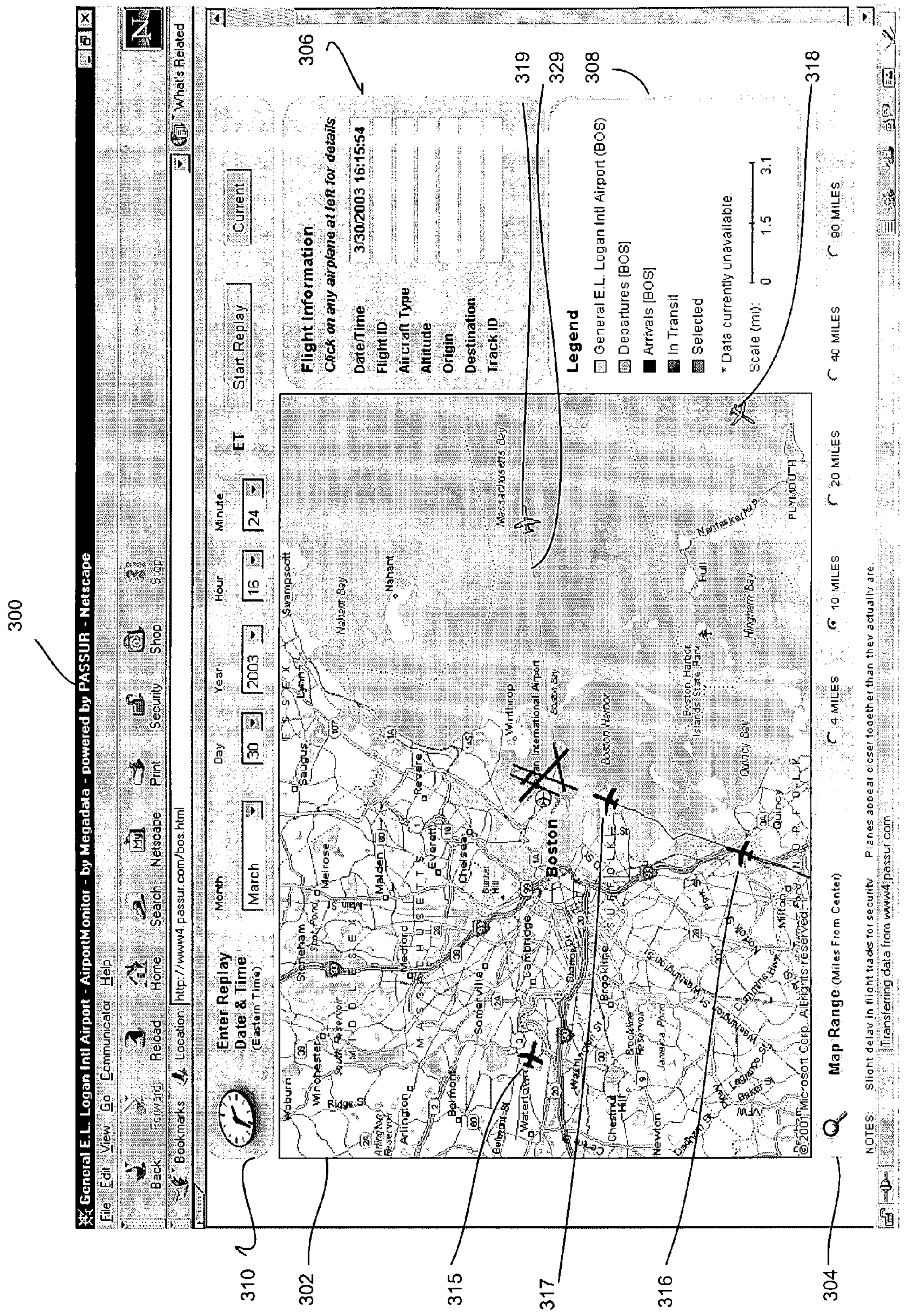
FIG. 3 shows an exemplary display screen that may be generated by the FTDS system server and transmitted to the users via the web server software according to the present invention.

FIG. 3 shows an exemplary display screen 300 that may be generated by the FTDS system server 120 and transmitted to the users 200–202 via the web server software 130. The exemplary display screen 300 shows a web page display that is formatted by the Netscape Navigator web browser (e.g., the web browser on users' stations 200–202). The display screen 300 includes a map portion 302, a map range field 304, a flight information box 306 a legend box 308 and a replay field 310. Each of these areas will be described with reference to the display 300, except for the replay field 310 which will be described with reference to a later exemplary screen.

This display shows that the airport being used in this example is Logan International Airport in Boston, Mass. The displayed map 302 shows Logan International centered on the map 302 with a zoom set at ten (10) miles from the center as shown by the map range field 304 at the bottom of the screen 300. As can be seen from the map range field 304 there may be other preset zoom ranges, e.g., 4 miles, 20 miles, 40 miles, 90 miles. It may also be possible to have a variable zoom and pan features as are known in the art, i.e., the zoom may be adjusted to any level of detail desired by the user and/or the user may recenter the map on another feature rather than the airport itself.

This example display screen 300 is a near real time display as shown in the flight information box 306, the display is current as of the date and time of Mar. 30, 2003 at 16:15:54. This display is termed a near real time display because, while it is possible to create a real time display according to the present invention, this embodiment utilizes a ten (10) minute delay for security purposes. Thus, a user would see the display screen 300 at the real time of Mar. 30, 2003 at 16:25:54 (i.e., ten (10) minutes after the time shown in the flight information box 306). The other information contained in the flight information box 306 will be described in greater detail below.

Referring to the map portion 302, there are five (5) airplane icons 315–319 shown on the map 302. These icons 315–319 represent the current location (as of the date/time shown in the flight information box 306) of the aircraft that are currently being tracked within the confines of the map 302 area. The display 300 for the present invention may have the capability to display a plurality of aircraft tracks (e.g., up to 40 separate tracks in the target area) overlaid on the background map 302. There may be more aircraft currently being tracked by the exemplary FTDS system 1, but these aircraft are not located within the zoom area of the map 302 currently being displayed, i.e., these other aircraft are outside the 10 mile zoom area of map 302.

Each aircraft icon 315–319 is displayed with a "tail" showing its most recent flight path. For example, an aircraft icon 319 is shown on the display 300 having tail 329. This display may show the entire path of aircraft 501 when it is in the target area. Thus, the aircraft icon and the tail represent the flight track of the target aircraft. The FTDS system server 120 software generates this flight track for aircraft located in the target area using the data in the target flight record for the target aircraft.

As described above, the FTDS system server 120 receives target data points for the target aircraft from the data feed arrangement 100. The FTDS system server 120 combines these data points into a target flight record. Therefore, if it was considered that each target data point for a target aircraft included a target identification, the time and the target's position (x-y position), the FTDS system server 120 would then combine each of these target data points into a target flight record that would contain the target's position over time. The FTDS system server 120 may then use this data to generate the aircraft icon and the tail in the proper location on the map 302.

As described above, the target data points are received from data feed arrangement at some time interval (e.g., every 4.6 seconds for the PASSUR™ System). An aircraft may be traveling at hundreds of miles per hour, thus the location of the aircraft may change significantly within this time interval. The FTDS system server 120 may have to interpolate the path of the aircraft during this missing time (i.e., the FTDS system server 120 has the location at time 1 and at some later time 2, but needs to interpolate the locations between these two times). Thus, when the aircraft is flying a straight line or a making a turn, smoothing techniques based on the previous locations are used to create smooth flight tracks. Also, as described above a data feed arrangement such as the PASSUR™ System may input the target data points that have already been smoothed by a smoothing algorithm.

The legend box 308 of the display 300 shows a legend which may be used to aid users in understanding the display. The legends may be color codes which aid in quickly identifying the nature of the display. The specific color codes are not shown in the black and white drawing of FIG. 3, but exemplary color codes will be described. The first color code may be a code to easily identify the location of the airport (e.g., the Logan International location is shown in gray on the map 302). The second color code identifies those flights which departed from Logan International (e.g., all green aircraft icons took off from Logan). The third color code identifies those flights which are to arrive at Logan International (e.g., all blue aircraft icons are scheduled to land at Logan). The fourth color identifies those flights which are in transit (e.g., all black aircraft icons are traveling through the target area, but did not take off and are not scheduled to land at Logan). The fifth color icon is for those aircraft that have been selected by the user (e.g., the red aircraft icon has been currently selected by the user). The purpose and process of selecting an aircraft will be described in greater detail below. Another example of a color code may be a color code for a plane that is to land at a nearby airport.

These color codes as described for the legend box 308 will aid the user to quickly and easily identify information about a particular flight track. The information used to provide the color coding for the aircraft is provided to the FTDS system server 120 by the data feed arrangement 100. For example, the target data point for each target aircraft may include the origin and destination of the aircraft. This data may be used by the FTDS system server 120 to properly color code the corresponding icon. Those of skill in the art will understand that the origin and destination information may be transmitted with each target data point for the target aircraft or with less than each target data point for the target aircraft. Once the origin and destination are associated with a particular flight track in the target flight record by the FTDS system server 120 this information may not be needed for each target data point because the origin and destination will not change over time as parameters such as the aircraft's location.

Figure 4:
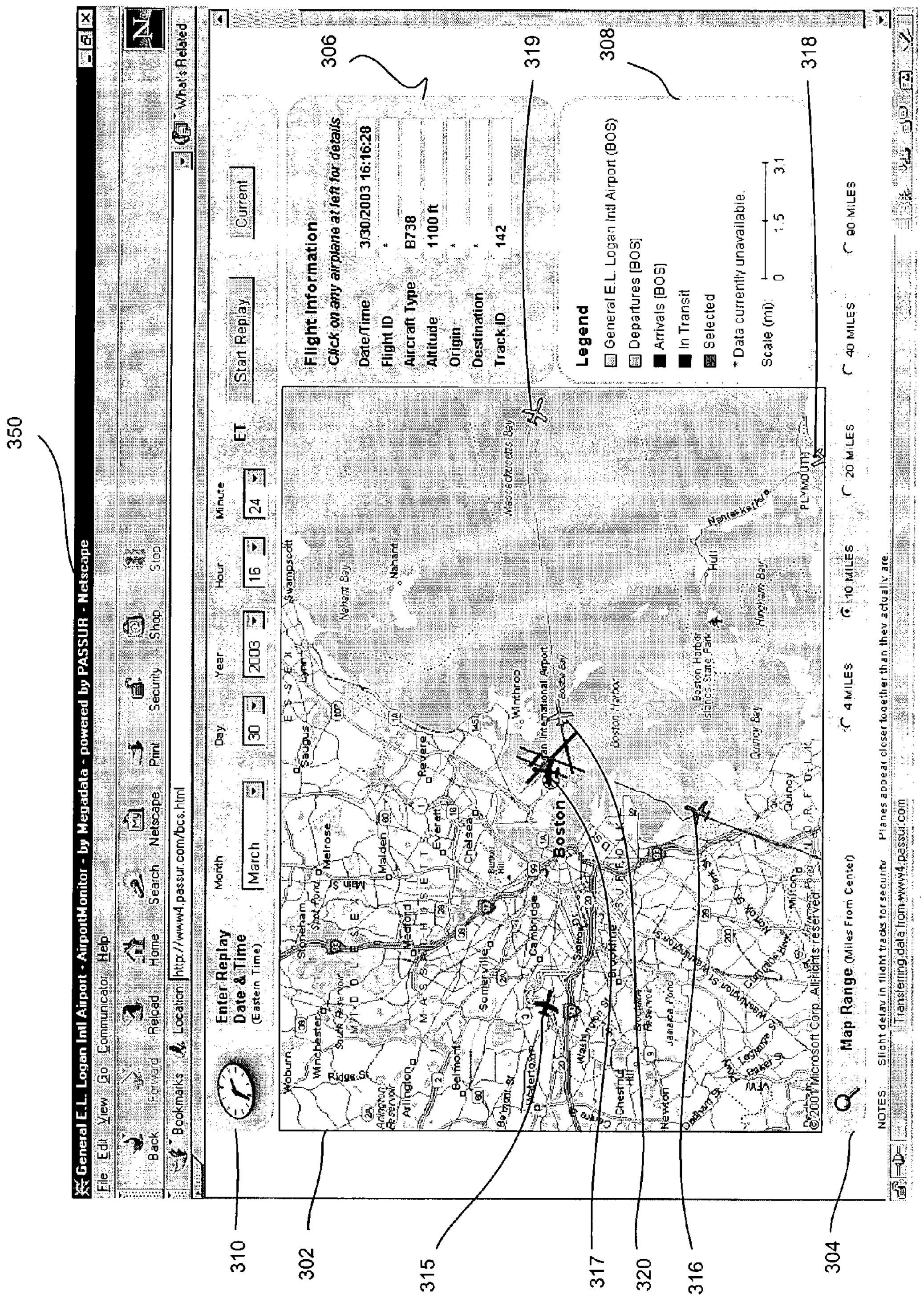
FIG. 4 shows a second exemplary display screen that may be generated by the FTDS system server and transmitted to the users via the web server software according to the present invention.

FIG. 4 shows a second exemplary display screen 350 that may be generated by the FTDS system server 120 and transmitted to the users 200–202 via the web server software 130. The display screen 350 includes the same general areas as the display screen 300, i.e., the map portion 302, the map range field 304, the flight information box 306, the legend box 308 and the replay field 310. As can be seen from the flight information box 306, the date/time of this display 350 is Mar. 30, 2003 at 16:16:28 which is thirty-four (34) seconds after the display 300. In this exemplary display 350, there are six aircraft icons 315–320. The icons 315–319 represent the same flight tracks as shown on display 300. A comparison of the displays 300 and 350 will show that the aircraft icons 315–319 have moved their relative locations on the map 302 in the thirty-four seconds which has elapsed between the displays (e.g., aircraft icon 318 has almost moved out of the map range on the display 350). It should be understood that the thirty four seconds between the displays 300 and 350 is only exemplary and that an actual user logged into the exemplary FTDS system 1 may see multiple screen updates in this thirty four second period (e.g., every 4.6 seconds when the data feed arrangement 100 is the PASSUR™ System).

The aircraft icon 320 is a new flight track that has appeared on display 350 that was not on display 300. The color coding of the aircraft icon 320 may indicate that the target aircraft has departed from Logan International. This flight track provides an example of a new target flight record being created by the FTDS system server 120. For example, at some time between the time of the display 300 and the display 350 (e.g., the thirty-four second interval), the target aircraft represented by the icon 320 departed from Logan International. The data feed arrangement 100 sent a target data point for that aircraft to the FTDS system server 120 which attempted to place the data from the target data point into a target flight record. However, the FTDS system server 120 determined that this target data point was not associated with any currently tracked aircraft and therefore this was a new aircraft for which a new flight track is to be created. Therefore, the FTDS system server 120 created a new target flight record and saved the target data points for this aircraft in the new target flight record. The FTDS system server 120 then used the data in the new target flight record to create the flight track 320 displayed on the display 350.

Referring to the flight information box 306 of the display 350, information in addition to the current date and time is shown in the flight information box 306. Specifically, the Aircraft Type ("B738"), the altitude (1100 ft) and the track ID (142). This additional information is specific for an individual flight track as displayed on the map 302. As shown at the top of the flight information box 306, the display 350 allows for a user to "Click on any airplane at left for details." Thus, a user displaying the display 350 may, for example, select a particular flight track by placing the mouse icon on the aircraft icon and clicking. The user may receive a positive feedback from the display in the form of the aircraft icon changing from its current color coding to a color coding indicating that the flight track was selected. The color coding indicating that an aircraft was selected may be displayed in legend box 308. Once the individual flight track has been selected, additional information for that flight may be displayed in the flight information box 306.

To give a specific example of a flight track being selected, it may be considered that on the display 350, the user placed the mouse icon over the aircraft icon 316 and clicked. As a result, the aircraft icon may have changed color from a blue icon indicating the aircraft is scheduled to land at Logan International to a red icon indicating that the user has selected this flight track to obtain additional information about the aircraft's flight path. Simultaneously with this selection, the additional information for this flight path 316 appeared in the flight information box 306. This additional information included the type of aircraft (B738), the current altitude (1100 ft) and the track ID (142) for this aircraft. This information may also be included in the target data points provided by the data feed arrangement 100 to the FTDS system server 120 for each aircraft being tracked. Thus, the user has obtained additional information about the flight track of interest by simply clicking on the aircraft icon.

As shown in flight information box 306, there may be additional information that can be displayed for the flight track. However, this information may not be displayed at this time for a variety of reasons. For example, because of security concerns the airport/airline may not desire to display the flight identification information or the origin/destination information on the near real time display. Another example may be that some information is not yet available. For example, as described above, the data feed arrangement 100 may actually be a series of independent data feed arrangements which contribute different data to the FTDS system server 120. These independent data feed arrangements may send this data at different times and different data refresh rates. Thus, the FTDS system server 120 needs to correlate this varying data to the correct target flight record and compare the data from the varying data feed arrangements to insure the accuracy of the information. In such cases, not all the information may be correlated and verified to be displayed on the near real time display.

Figure 5:
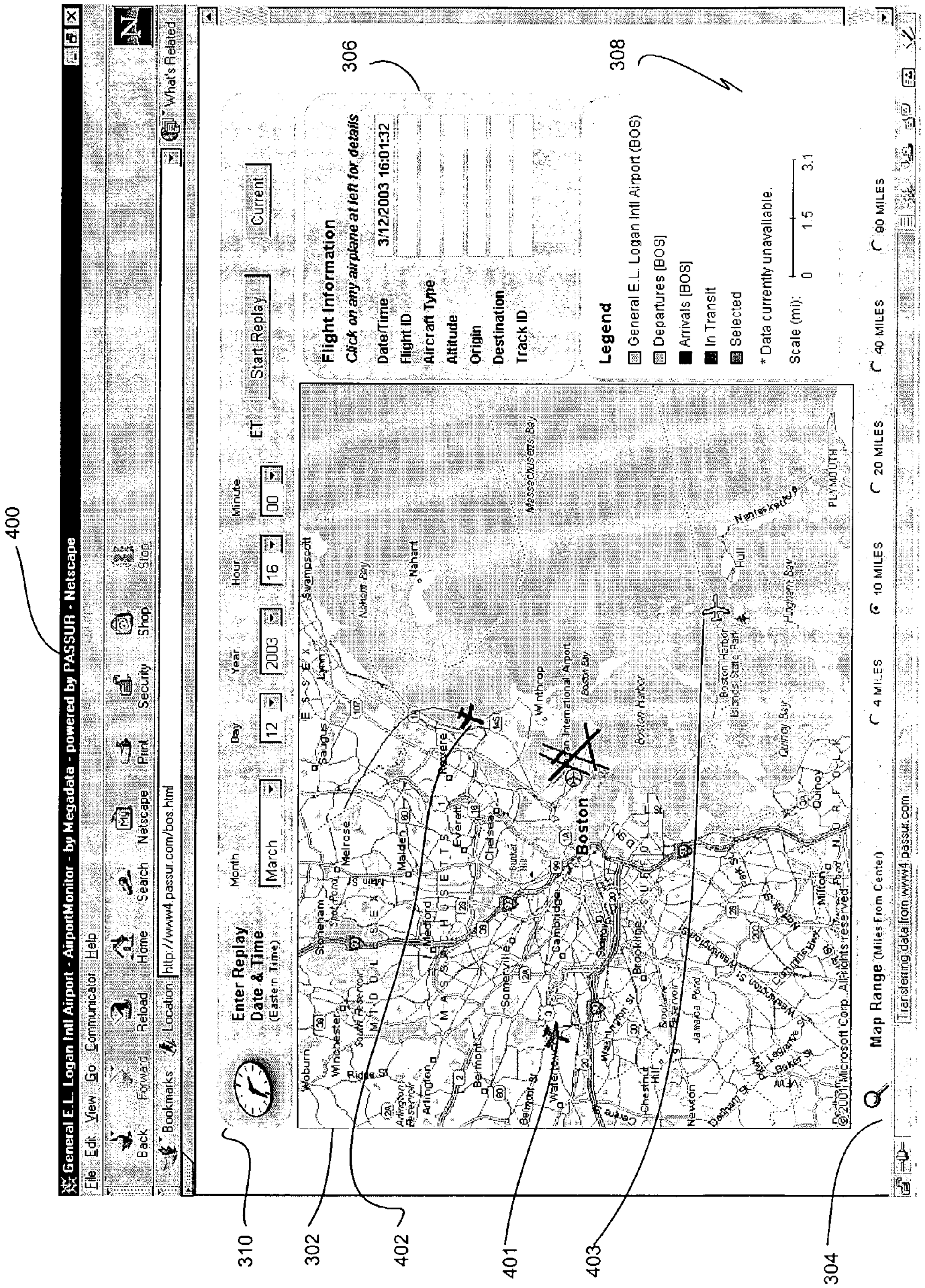
FIG. 5 shows an exemplary display screen that may be generated by the FTDS system server in response to a user’s replay request according to the present invention.

FIG. 5 shows an exemplary display screen 400 that may be generated by the FTDS system server 120 in response to a user's replay request. The display screen 400 has the same general areas 302–310 as the previously described displays 300 and 350. However, the exemplary display 400 is not a near real time display as the displays 300 and 350, but is a replay of past activity. The replay field 310 of the display 400 allows a user to select a past date and time to begin playback of the flight tracks from that time. In this example, the user has selected via the pull-down menus in the replay field to begin playback on Mar. 12, 2003 at 16:00. The user may then click on the start replay button in the replay field.

In response to this request from the user, the FTDS system server 120 will retrieve the saved target flight records which include this date/time information and begin the replay of the flight tracks starting with the time entered by the user. As can be seen from the flight information box 306, the display 400 is from Mar. 12, 2000 at 16:01:32 or 1 minute 32 seconds after the replay started as entered by the user. The FTDS system server 120 retrieved the applicable target flight records and used the data to generate the flight tracks 401–403 as shown on the map 302. The method of generating the flight tracks is the same as that with the real time data except that the FTDS system server 120 is not using the information currently being received from the data feed arrangement 100. Rather, the data is from archived target flight records which correspond to the time entered by the user.

The only limitation on the replay feature may be the amount of data which can be stored in the FTDS server 110. As long as the FTDS system server 120 can access the appropriate target flight records, the FTDS system server 120 can generate the flight tracks using the archived data. In addition, the FTDS system server 120 may generate the replay flight tracks in a fast forward manner. For example, the flight tracks may be displayed in 5 times (5×) speed or any other speed selected by the user. Since the data is archived data, the FTDS system server 120 does not need to wait for the data feed arrangement to send new target data points for the flight tracks, it merely needs to generate the flight tracks from the archived target flight records.

Figure 6:
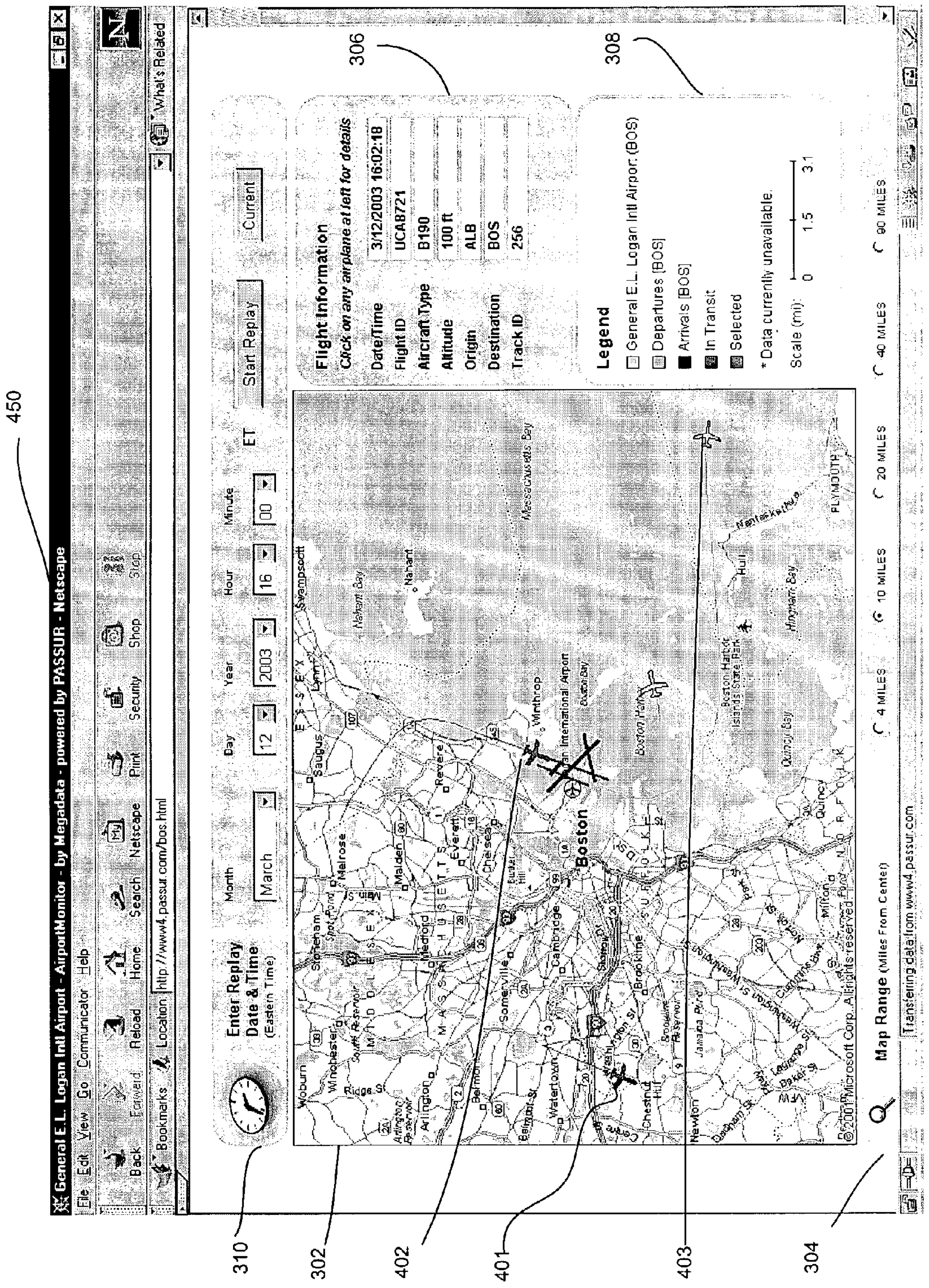
FIG. 6 shows a second exemplary display screen that may be generated by the FTDS system server in response to a user’s replay request according to the present invention.

FIG. 6 shows a second exemplary display screen 450 that may be generated by the FTDS system server 120 in response to a user's replay request. The display 450 once again contains the same areas 302–310 as described for the previous displays. The display 450 is a continuation of the replay which was described with reference to display 400 in FIG. 5. The flight information box 306 shows that the flight tracks currently being displayed are from Mar. 12, 2003 at 16:02:18 or forty-six (46) seconds after the display 400. As can be seen from the flight tracks 401–403, the aircraft icons have been displaced from the locations shown on display 400.

In this exemplary display 450, the user has selected the flight track 402 to obtain additional information by placing the mouse icon over the aircraft icon 402 and clicking. In response, the aircraft icon 402 has changed color indicating that it has been selected for a request of additional information. Simultaneously, the information concerning the flight is displayed in flight information box 306. In contrast to display 350, all the information for the current flight is displayed. Since the current display is a replay all the data has been correlated and verified and there are no safety concerns about providing the user with flight information at a time which may be hours, days, weeks or months after the flight has passed through the airspace. Thus, the user now has all the available information about this particular flight, including the flight ID (UCA8721) the origin (ALB) and the destination (BOS). Those of skill in the art will understand that the display 450 is only exemplary and that depending on the amount and type of data provided by the data feed arrangement 100, the flight information box 306 may provide more or less information than shown in the display 450. Examples of enhanced data about the flight may include the type of engines on the plane, the manufacture date of the plane, etc. The user may also revert back to the near real time display by clicking the current button provided in the replay field 310.

It should be understood that a user may use the current displays and the replays displays to gain a complete understanding about the flight track of a particular aircraft. For example, the user may hear or see an airplane fly over his house at a particular time. The user may then use the near real time display to determine certain information about the flight as shown on display 350 of FIG. 4. The user may then go back and use the replay function at a later time to display the same flight track to obtain the complete information for the flight as shown in display 450 of FIG. 6. Since the user may enter the time for the replay and since the initial information provides a time/date and a track ID, the user may easily verify that he is obtaining information on the same flight.

Figure 7:
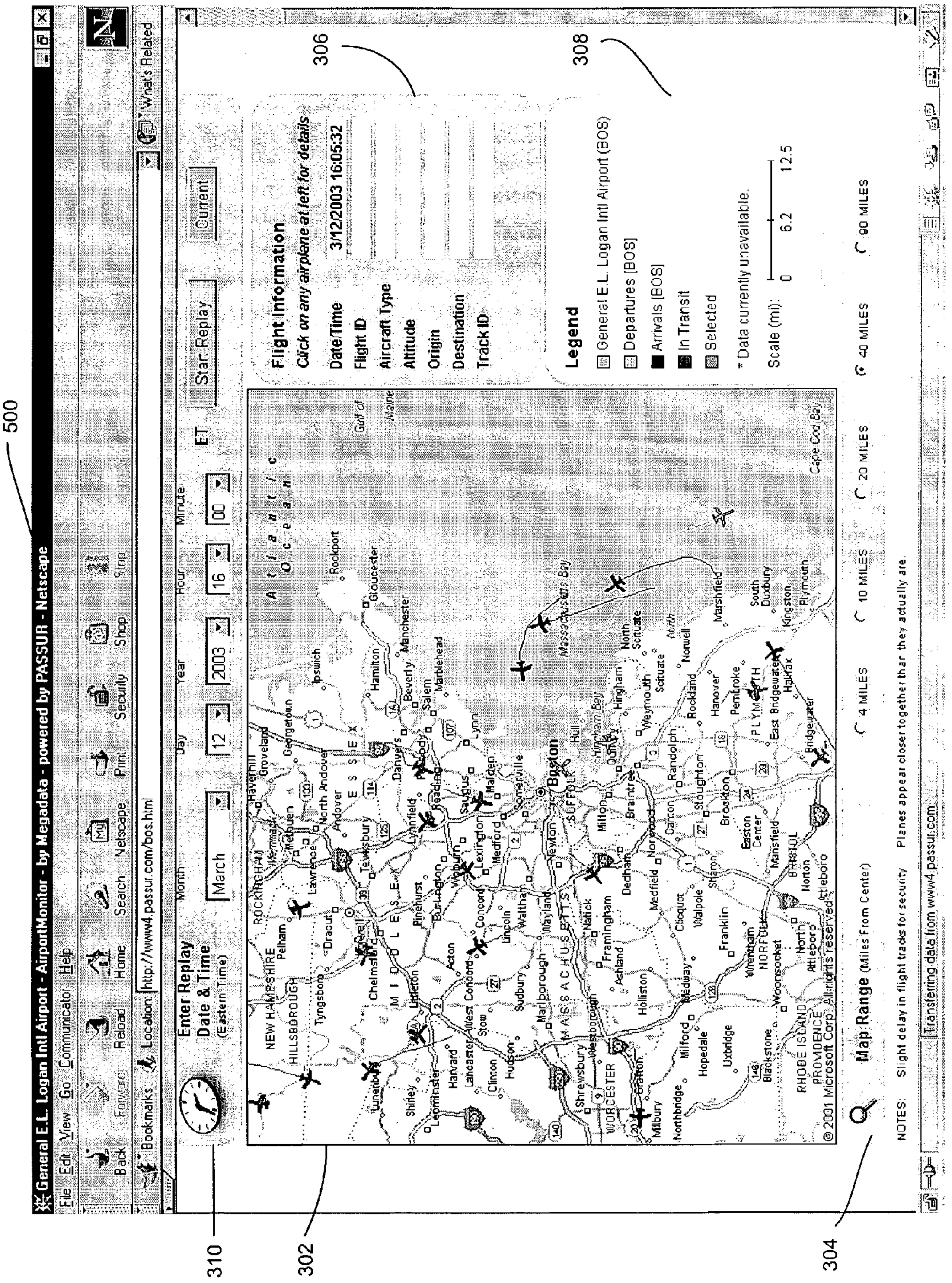
FIG. 7 shows an exemplary display screen that may be generated by the FTDS system server which has a wider zoom display according to the present invention.

FIG. 7 shows an exemplary display screen 500 that may be generated by the FTDS system server 120 which has a wider zoom display. Once again, the display 500 has the same general areas 302–310 as shown and described for previous displays. The display 500 is a continuation of the replay started in the examples of displays 400 and 450. However, in this exemplary display 500, the zoom range has been expanded to 40 miles, i.e., Logan International airport is shown in the center of the map 302, but the map extends for 40 miles around the airport. This 40 mile zoom range is indicated by the map range field 304.

The number of flight tracks to be displayed may depend on the zoom level and the appearance on the screen. Thus, there are more flight tracks on the display 500 having a zoom range of 40 miles as opposed to the previously described displays 300, 350, 400, 450 having zoom ranges of 10 miles. In some cases, the screen may appear too cluttered in high traffic local areas, e.g., New York, Los Angeles and other major metropolitan areas. In this case, filters may be used to reduce screen clutter. For example, a filter may be used to select only the flights associated with a particular airline or the "n" closest flights to these selected flights. Those of skill in the art will understand that there may be any number of filters that may be used to reduce the number of tracks shown an any particular screen. By selecting these filters, a user (e.g., users 200–202) may obtain the desired picture for presentation.

The present invention may also allow the developer to control the appearance of the display. This feature is for access of the developer to the information contained on the FTDS server 110 so the developer may change the features and functionality of the FTDS system 1. For example, the control may allow the developer to control the number of tracks to be displayed, the area of the display coverage and the selection of the appropriate background map. This feature may also allow the user or developers to apply certain overlays on the map, e.g., the street address or location of the user, a weather overlay from the National Weather Service, etc. Another feature which may be implemented in the FTDS system 1 is a find flight function. In this case the user may enter information about a particular flight and the FTDS system 1 would find the flight and display the flight track for that flight.

The FTDS system 1 enables the users 200–202 to become informed about the airspace surrounding their neighborhood and noise events resulting from aircraft. This information may lead to a reduction in call volume to the noise office of the local airport and a reduction in the costs associated with that office. Similarly, the noise office may be able to respond in a faster manner to complaints and other requests because the user will be informed and have the complete information about a particular flight.

As described above, the flight tracks may also be for other aircraft beside planes such as helicopters. The determination of whether a particular target aircraft is a helicopter as opposed to a plane may be determined by the performance of the aircraft. For example, the altitude, speed, flight pattern and beacon code may be used to distinguish a helicopter.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A system, comprising:

a data receiving arrangement to receive target data points from a data feed arrangement, each target data point including data corresponding to a location of a target aircraft and additional information on the target aircraft;

a data analyzing arrangement to analyze the target data points and store each target data point in a target flight record, the target flight record corresponding to the target aircraft;

a data generation arrangement to generate a flight track for the target aircraft using the data stored in the target flight record;

a data distribution arrangement to organize the flight track and the additional information into a displayable file and distribute the file to users of the system, wherein the displayable file is displayed on a single graphical user interface including the flight track and the additional information;

wherein the data generation arrangement updates the flight track when a new target data point is stored for the target aircraft during a flight of the target aircraft; and wherein the data distribution arrangement updates the displayable file each time the data generation arrangement updates the flight track during the flight of the target aircraft.

2. The system according to claim 1, wherein the displayable file further includes a map portion, the flight tracks being overlayed on the map portion.

3. The system according to claim 2, wherein a zoom level of the map is adjustable by a user.

4. The system according to claim 2, wherein the center location of the map is adjustable by a user.

5. The system according to claim 1, wherein the additional information includes one of a track identification, a time, an altitude, an x-velocity component, a y-velocity component, a z-velocity component, an airspeed, a flight number, an airline, and an aircraft type.

6. The system according to claim 1, wherein the data distribution arrangement includes a web server to distribute the displayable file.

7. The system according to claim 1, wherein the data generation arrangement includes a smoothing element to smooth the flight track to avoid an abrupt position change within the flight track.

8. The system according to claim 1, wherein the displayed flight track includes an aircraft icon and a tail.

9. The system according to claim 8, wherein the aircraft icon is color coded to indicate a status of the target aircraft.

10. A method, comprising the steps of:

collecting target data points corresponding to data for target aircrafts;

storing each of the target data points in a target flight record, wherein each target flight record corresponds to one target aircraft and each target data point includes data corresponding to a location of the one target aircraft and additional information on the one target aircraft;

creating flight tracks from each of the target flight records;

creating a displayable file including the flight tracks and the additional information, wherein the displayable file is displayable on a single graphical user interface;

updating the flight track of the one target aircraft as new target data points are stored in the target flight record corresponding to the one target aircraft; and creating a new displayable file including the undated flight track of the one target aircraft.

11. The method according to claim 10, further comprising the step of:

distributing the displayable file to users.

12. The method according to claim 11, wherein the displayable file is distributed via a web server.

13. The method according to claim 10, further comprising the step of:

creating a new target flight record when a collected target data point corresponds to a previously undetected target aircraft.

14. A system, comprising:

a system server collecting target data points corresponding to data for target aircrafts, storing each of the target data points in a target flight record, wherein each target flight record corresponds to one target aircraft and each target data point includes data corresponding to a location of the one target aircraft and additional information on the one target aircraft, creating flight tracks from each of the target flight records and creating a displayable file including the flight track and the additional information, wherein the displayable file is displayable on a single graphical user interface,wherein the system server updates the flight record of the one target aircraft during the flight of the one target aircraft; and a web server to distribute the displayable file to users of the system.

15. The system according to claim 14, wherein the displayable file is distributed via a communication network.

16. The system according to claim 15, wherein the communication network is the Internet.

17. The system according to claim 14, further comprising:

a data feed arrangement sending the target data points to the system server.

18. The system according to claim 14, wherein the target data points are collected by receiving a serial stream via a one way socket connection.

19. The system according to claim 14, wherein the system server updates the displayable file upon collection of each new target data point and the web server automatically distributes the updated displayable file to the users.

20. The system according to claim 14, wherein the web server distributes the displayable file to the users with a ten minute delay from the receipt of the target data points.

21. The system according to claim 14, wherein a user selects a previously saved time frame for which the displayable file is replayed.

22. The system according to claim 21, wherein the displayable file is fast forward updated when a user selects a saved time frame.

* * * * *